April 10, 1928.   R. P. WHITE   1,665,828
BAIL EAR
Filed Aug. 9, 1926   3 Sheets-Sheet 1
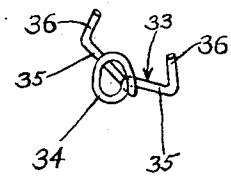
Fig. 3
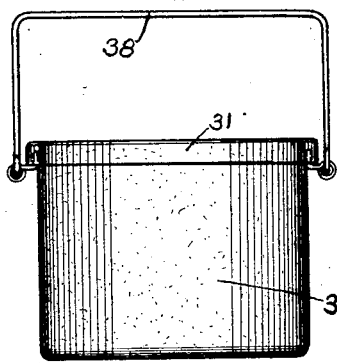
Fig. 1
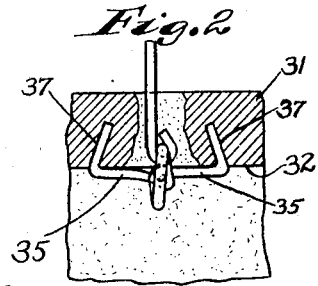
Fig. 2
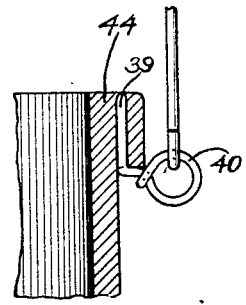
Fig. 5
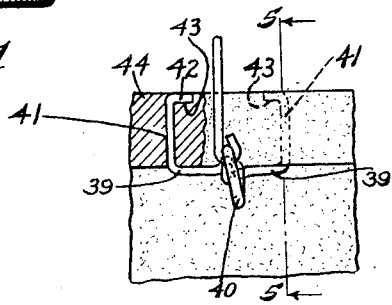
Fig. 4
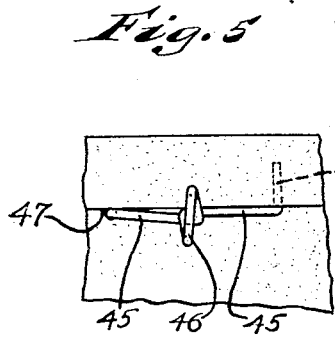
Fig. 6
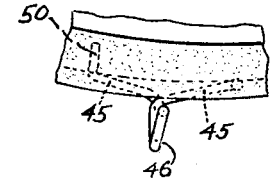
Fig. 8
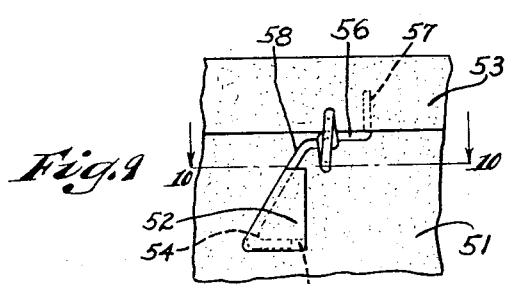
Fig. 7
Fig. 9
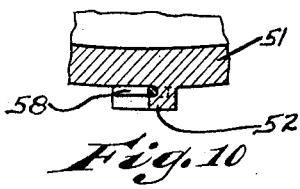
Fig. 10
Witnesses:
C. E. Wissels
Inventor:
Richard P. White,
By Joshua R. H. Potts
his Attorney.

April 10, 1928.
R. P. WHITE
1,665,828
BAIL EAR
Filed Aug. 9, 1926
3 Sheets-Sheet 2
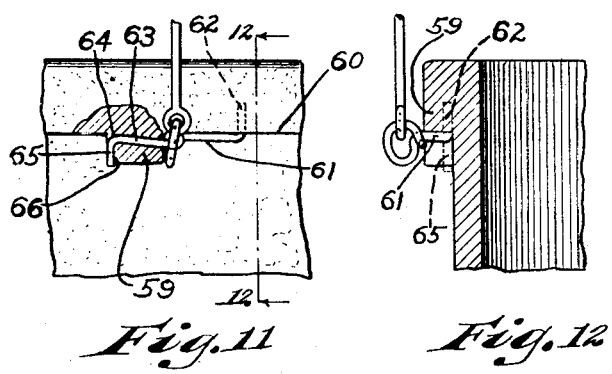

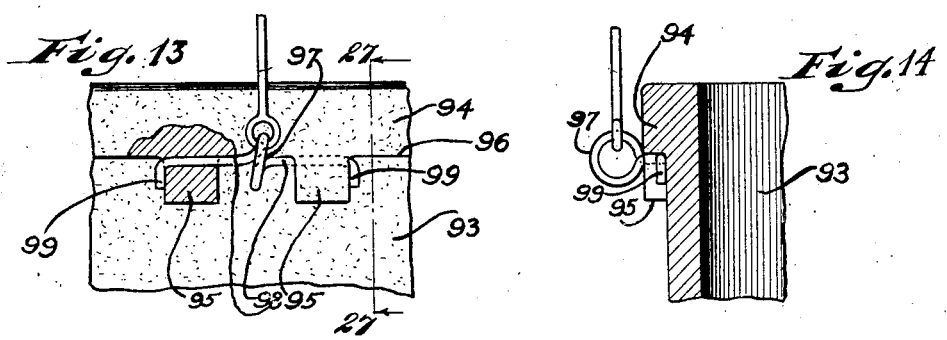

Patented Apr. 10, 1928.

1,665,828

UNITED STATES PATENT OFFICE.

RICHARD P. WHITE, OF CHICAGO, ILLINOIS.

BAIL EAR.

Application filed August 9, 1926. Serial No. 128,101.

My present invention relates to bail ears.

It is within the province of this disclosure to improve generally in the construction of bail ears and to embrace the utility of devices of this type in connection with earthenware or pottery vessels, glass vessels, and even vessels made of metal and wood where the invention appertains.

The object of my invention is the provision of a simple and efficient construction of means for interlocking the bail ears with the vessels of which they form a part and for preventing the disengagement from the bail ears of the carrying bails or handles for the vessels.

One of the outstanding objects of my invention is to provide bail means which will be extremely simple in construction, highly efficient in use, and cheap to manufacture and attach, and which will not be likely to become detached, distorted or otherwise get out of order.

Other objects will appear hereinafter.

The invention consists in the combinations and arrangements of parts hereinafter described and claimed.

The invention will be best understood by reference to the accompanying drawings forming a part of this specification, and in which, Fig. 1 represents a front elevational view of an earthen vessel equipped with my improved bail attaching means;

Fig. 2 is a fragmentary elevation and section showing the arrangement of the bail attaching wire;

Fig. 3 is a perspective view of the bail attaching wire;

Fig. 4 is a fragmentary elevation and partial section showing a modified form of the bail attaching wire;

Fig. 5 is a vertical section taken on the line 5—5 of Fig. 4;

Fig. 6 is a fragmentary perspective and section showing another form of a bail attaching wire;

Fig. 7 is a front elevation of the parts shown in Fig. 6;

Fig. 8 represents a top plan of the parts shown in Fig. 7;

Fig. 9 represents a fragmentary front elevation showing a further modification in the construction and arrangement of the bail attaching wire and vessel;

Fig. 10 represents a horizontal section taken on the line 10—10 of Fig. 9;

Fig. 11 is a fragmentary front elevation and partial section showing another modification;

Fig. 12 is a vertical section taken on the line 12—12 of Fig. 11;

Fig. 13 is a fragmentary elevation showing a further modification in the construction of an earthenware vessel and a modified form of bail attaching wire for use in connection therewith;

Fig. 14 is a vertical section taken on the line 27—27 of Fig. 13.

The accompanying drawings illustrate the preferred embodiments of my invention, one such embodiment being illustrated in detail in Figs. 1 and 2, in which 30 designates an earthenware vessel made with a rim bead 31 having an over-hanging shoulder 32. 33 designates as a whole the bail attaching means comprising a single length of wire bent to form a midway loop 34 and oppositely projecting arms 35 which are bent at an angle to produce upwardly projecting prongs 36. In this construction, the oppositely projecting arms 35 underlie the over-hanging shoulder 32 whereby to support the vessel when lifted; and the prongs 36 are seated in openings or bores 37 which extend upwardly into the body of the bead 31 from the shoulder 32. According to an important feature of this construction, the bores 37 and the interlocking prongs 36 are spaced farther apart at the bottom than at the top to safe-guard against any withdrawal of the prongs from the bores. The bail attaching wire being made of spring material, the prongs 36 are applied to the bores 37 under tension. Under this arrangement, the weight of the vessel and contents thereof are supported through the over-hanging bead 32 upon the arms 35 and the interlocking tension of the prongs in their bores increases with the increase of weight imposed upon the arms 35. As shown in Fig. 1, a bail attaching wire is thus applied to the bead at diametrically opposite points and a carrying bail 38 has its terminals looped through the loops 34 of the bail carrying wires.

In the modified form of the bail carrying wire shown in Figs. 4 and 5, the arms 39 which project in opposite directions from the midway loop 40 are fashioned to extend upwardly through openings or bores 41 provided in the bead after which they are bent over at 42 within countersunk recesses 43 provided in the top edge 44 of the bead, said countersunk recesses comprising angular end portions of the bores 41. In this modified form the bead rests upon the oppositely directed arms 39 when the vessel is lifted or carried and the over-bent portions 42 positively prevent withdrawl of the arms from their bores. This type of bail attaching wire is preferably used for large and heavy vessels, whereas the type illustrated in Figs. 1, 2 and 3 is preferably used for vessels of less size and weight.

In Figs. 6, 7 and 8 I have shown another form of bail attaching wire. Here the arms 45 which project in opposite directions from the midway loop 46 underlie the shoulder 47 of the bead as in the previous instances; but while one of the arms has an upwardly bent prong 48 seated in a bore 49 which extends upwardly into the body of the bead from the shoulder, the other of the arms has an inwardly or horizontally bent prong 50 which seats in a suitable opening extending inwardly into the body of the vessel from the outer face thereof at a point substantially in line with the shoulder 47. Thus, in this arrangement, the vessel through the over-hanging bead is supported upon the arms 45, one of which is bent upwardly and interlocked in the body of the bead while the other is bent horizontally and interlocked in the body of the vessel.

In the form of construction shown in Figs. 9 and 10 the earthen vessel 51 is made with an integral lug 52 in spaced relation to the bead 53. Said lug 52, substantially of triangular form, has a notch 54 along its inclined side and a communicating notch 55 along its base side. In this instance the bail attaching wire has one arm 56 underlying the bead and provided with a prong 57 which extends upwardly into the body of the bead, while the other and longer arm 58 is bent downwardly to seat in the notch 54 and is then bent at an angle about the lug to seat in the notch 55.

Referring to Figs. 11 and 12, wherein I have shown another form of construction, it will be seen that the lug 59 is formed integral with the bead and with the vessel and that this lug projects downwardly below the overhanging shoulder 60. The bail attaching wire for this form includes an arm 61 underlying the overhanging shoulder and an upbent prong 62 which is fitted into the body of the bead, the other arm 63 being fitted in a bore 64 in the lug and being bent at an angle 65 within a countersink 66 comprising an angular end portion of the bore. This is an especially strong arrangement.

In Figs. 13 and 14, an earthen vessel 93 is made with a bead 94 having two integral lugs 95 which extend below the overhanging shoulder 96. These lugs are produced in spaced apart relation as clearly shown in Fig. 13; and the loop 97 of the bail attaching wire is so applied that its oppositely projecting arms 98 will underlie the overhanging shoulder and be seated in suitable openings in the lugs 95 over the outer ends of which wire portions 99 may be bent as shown.

The various arrangements shown and described herein are very simple in construction, are inexpensive to manufacture and are readily applied. In each instance, the bail attaching device is designed so as to afford a firm and staunch connection that is not liable to become disconnected or to get out of order.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. The combination with a vessel having a shoulder and openings, of a spring wire looped to form bail attaching means; arms extending from the loop and underlying the shoulder; and prongs projecting from the arms and placed under tension in said openings, substantially as described.

2. In combination with a vessel having a bead forming a shoulder and provided with separate openings extending upwardly into its body from the shoulder and terminating in angular end portions, of a spring member looped to form bail attaching means; arms extending from the loop and underlying the shoulder; prongs projecting from the arms and seated in said openings; and over-bent portions on the prongs engaging in the angular end portions of said openings, substantially as described.

In testimony whereof I have signed my name to this specification.

RICHARD P. WHITE.